United States Patent [19]

Rutter

[11] Patent Number: 4,809,440
[45] Date of Patent: Mar. 7, 1989

[54] IN DIAL BORE GAGES
[75] Inventor: Harold T. Rutter, Kirkwood, Mo.
[73] Assignee: Sunnen Products Company, St. Louis, Mo.
[21] Appl. No.: 154,950
[22] Filed: Feb. 11, 1988
[51] Int. Cl.$^4$ .................................................. G01B 3/28
[52] U.S. Cl. ...................................... 33/178 R; 33/828
[58] Field of Search ............. 33/178 R, 164 B, 164 D, 33/165, 167, 172 R, 173

[56] References Cited

U.S. PATENT DOCUMENTS 3,936,545  2/1976  Jevremov ..................... 33/172 R

FOREIGN PATENT DOCUMENTS 433368  4/1948  Italy ..................... 33/178 D

Primary Examiner—Harry N. Haroian
Attorney, Agent, or Firm—Haverstock, Garrett & Roberts

[57] ABSTRACT

An improved dial bore gage having an adjustment mechanism associated therewith for adjusting the relative axial positions of the probe and dial portions of the gage, the adjustment mechanism including a first member operatively connected to the dial portion of the gage having a first threaded portion associated therewith of a predetermined thread pitch, a second member operatively connected to the probe portion of the gage having a second threaded portion associated therewith of a different predetermined thread pitch, and an adjustment member rotatably mounted to the first and second members, the adjustment member having spaced threaded portions to correspond to and mate with the threaded portions on the first and second members whereby rotation of the adjustment member will produce relative axial movement between the first and second members and this in turn will produce changes in the gage setting for each position thereof. The present dial bore gage also includes a mechanism for releasing pressure on the gaging contacts of the gate to facilitate movement into and out of a bore to be gaged and mechanisms for providing both axial and angular backlash compensation between the probe and dial portions of the gage.

13 Claims, 2 Drawing Sheets

IMPROVEMENTS IN DIAL BORE GAGES

The present invention relates to dial bore gages which are used for determining if the diameter and surface characteristics of cylindrical work surfaces are of some precise size and characteristics and, more particularly, to improved means for making fine adjustments between the probe tip and the movable pointer portion of the dial indicator associated with such gaging devices. The present means enables a user to more easily and more accurately adjust the movable dial indicator pointer to a zero setting after the gaging contacts associated with the probe tip have been calibrated to a preset diameter thereby zeroing the dial indicator to a preset diameter on the probe tip prior to usage.

BACKGROUND OF THE INVENTION

Dial bore gages are specifically used to determine if the diameter and surface characteristics of cylindrical holes or bores are accurate to some known standard and such gages include gaging head members which gage the surface and have portions operatively connected to dial indicator means which indicate the condition and size of the hole or bore. Such dial bore gages are generally set and calibrated prior to usage based upon the final desired size or diameter of the bore to be gaged so that a user may quickly and accurately determine if the diameter and surface characteristics of such bore are of the desired size and finish, or if the diameter and surface finish is off by some amount, and if so, whether the bore is over or under size. This calibration is usually accomplished by placing the dial bore gage on a setting fixture, the setting fixture providing holding and supporting means for adjusting the alignment of the gaging contacts associated with the probe tip of a particular dial bore gage to the setting surfaces associated with the setting fixture. This procedure establishes the precise known distance between the gaging contacts and, based upon this known standard, the diameter and surface characteristics of a particular cylindrical hole or bore may be gaged. Typical of known setting fixtures is the fixture disclosed in Sunnen U.S. Pat. No. 3,496,758 and the gage support means disclosed in co-pending Rutter et al U.S. patent application Ser. No. 142,192, filed Jan. 11, 1988.

Once the gaging contacts associated with a particular dial bore gage have been set and calibrated, it is generally desired to reposition the movable pointers associated with the dial indicator to a zero setting to facilitate easy reading of the dial indicator to determine if the diameter and surface characteristics of the bore to be gaged are of the desired size and finish. If the gaging contacts are set to the desired finished size of the bore to be gaged as previously explained and the dial indicator reads zero, then, when the gage is positioned within the particular bore for the gaging thereof, the bore diameter will, if proper size, correspond to the desired finish diameter set between the gaging contacts. A reading other than zero on the dial indicator such as a plus or minus reading on the dial face indicates that the particular bore is either over or under size.

Adjusting the movable pointers of the dial indicator to a zero reading has been accomplished in the past by using one of several known means. For example, zeroing of the dial indicator may be accomplished by either slidably or rotatably moving the dial indicator face so as to align the zero index marking on the dial with the dial pointer, or by otherwise moving the indicator stem associated with the particular gage to reposition the movable pointer over the zero index marking. It is an advantage to be able to zero the movable pointer associated with the dial indicator prior to usage for various reasons including for convenience purposes and for ease of reading the dial indicator during a gaging process. Typical of the known dial setting means are the means disclosed in U.S. Pat. Nos. 4,045,877; 4,476,634 and 4,477,977.

None of the known means for zeroing a dial indicator to a preset diameter of the probe tip makes such an adjustment between the probe tip and the dial portion independent of any outside means such as a setting fixture as is true of the present invention. Such an adjustment mechanism is advantageous and desirable because it enables a user to make an appropriate accurate adjustment between the probe tip and the indicator means in order to establish a desired relationship therebetween. Furthermore, such an arrangement is advantageous because it eliminates the need for having a movable dial indicator face and other relatively complicated mechanisms for zeroing the movable dial pointers including means for holding and/or locking the dial indicator face against further movement at any desired position. Still further, the present construction facilitates replacing probe tips or gaging heads of different ranges on the same gaging device and such construction may also increase the operating range of a particular gaging head. All of the novel features and capabilities made possible by the present adjustment means represent important advancements in the gaging of internal cylindrical surfaces and bores.

SUMMARY OF THE INVENTION

The present improvements reside in gage adjustment means that are positioned in the stem portion of a dial bore gage intermediate between the dial portion and the probe portion. The improvements include the provision of a threaded adjustment member rotatably mounted on the stem portion of the gage and having spaced threaded portions of slightly different pitch, one threaded portion cooperatively engaging a threaded portion of the same pitch on a gage stem attached to the housing for the dial portion of the gage and the other threaded portion of the adjustment member cooperatively engaging a threaded portion of the other pitch on a member that supports the probe or gaging head portion of the gage. Rotational adjustment of the threaded adjustment member produces relative axial movement between the respective members engaged with the differently threaded portions thereof and this in turn produces changes in the gage setting for each position thereof. The present improvement means also includes means resiliently urging the probe support means away from the dial portion of the gage to provide axial backlash compensation to improve the gage accuracy and response in all positions of adjustment. Additional means in the form of a screw and slot arrangement are provided between the probe support means and the dial indicator portion to prevent relative angular rotation between such members. The present improvements further include other resilient means, albeit weaker means, to maintain the operating arm of the dial indicator portion of the gage engaged with the probe portion.

Another novel feature of the present gage improvements resides in the gage release mechanism which includes means operable to release pressure on the work engaging members so that the probe portion of the gage can be inserted into a bore to be gaged without any outward or radial force being applied to the gaging contacts of work engaging portions thereby minimizing the possibility for damage or wear on the work engaging members due to rubbing which is important to maintaining the accuracy and longevity of these members. This also reduces the possibility of damage to the internal bore surface due to scratching or otherwise by the probe assembly. These are especially important considerations when gaging relatively deep bores and bores that have inerruptions such as bores having "O" ring grooves, retaining ring grooves, spaced groove portions and bores that have other types of interruptions.

The present dial bore gage improvements therefore provide a unique way for zeroing a dial indicator to some preset probe diameter; they improve gage accuracy and gage response; they provide both axial and angular backlash compensation between the probe tip and the dial indicator portions of the gage; and, as stated, they also provide a novel probe release feature which takes pressure off the work engaging elements thereby facilitating insertion and removal of the probe into and out of a bore to be gaged. These features make it easy to operate the gage and reduces wear on the work engaging gaging contacts.

Another important advantage of the present gage improvements over prior art constructions is that when the probe portion of the present gage is inserted into and attached to the gage assembly, the present adjustment means allows the gage to achieve the full range of movement associated with the gaging contacts without disassembly of the entire unit. This is an important practical advantage not available to known gages where disassembly is required to fully utilize the range of the probe. Therefore, to some extent, the present adjustment means extends the operating range of each probe assembly mounted thereon. All of these features represent important advances in the setting means for dial bore gages including contributing greatly to the accuracy of such gages.

The present means are especially applicable for use with dial bore gages having gaging heads or probes such as those disclosed in co-pending Rutter U.S. patent application Ser. No. 153,350, filed Feb. 8, 1988.

It is therefore a principal object of the present invention to provide improved means for adjusting the relative axial positions of the probe and dial portions of gages such as dial bore gages.

Another object is to provide improved means for zeroing in a setting on a dial indicator portion of a dial bore gage to establish some desired probe diameter.

Another object is to increase the accuracy of dial bore gages by providing backlash compensation between the probe and dial portions thereof.

Another object is to extend the life and accuracy of the work engaging members on a dial bore gage.

Another object is to provide means to release pressure on the work engaging members of a dial bore gage to facilitate insertion and removal thereof into a bore.

Another object is to provide means to reduce rubbing and abrading of the work engaging members on a dial bore gage.

Another object is to obviate the necessity to relocate the dial portion of a dial bore gage to establish a predetermined setting condition.

Another object is to provide improved adjustment means to accurately set a dimension into a dial bore gage.

Another object is to teach the construction and operation of a dial bore gage that is especially well suited for use with probe assemblies having pairs of opposed gaging and centralizing elements.

Another and important object is to simplify the construction, operation and accuracy of dial bore gages.

These and other objects and advantages of the present invention will become apparent to those skilled in the art after considering the following detailed specification of a preferred embodiment in conjunction with the accompanying drawings.

DETAILED DESCRIPTION OF THE PREFERRED EMBODIMENT

Figure 1:
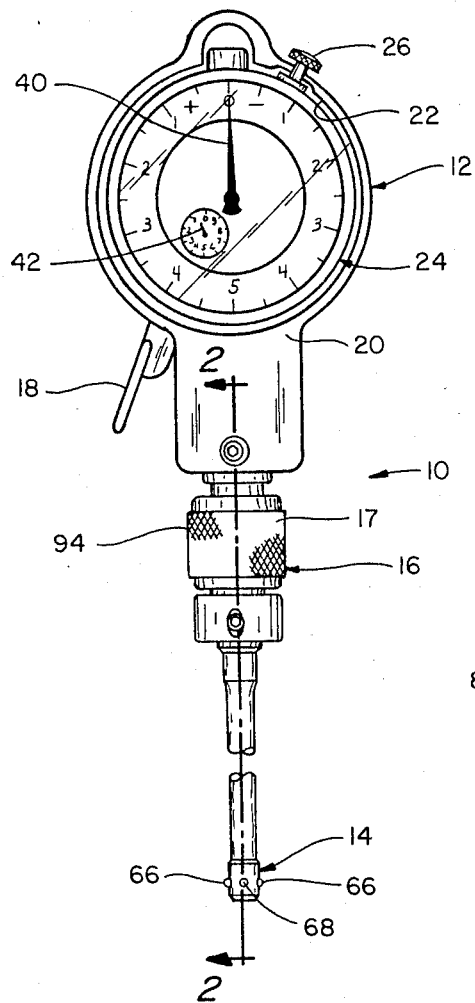
FIG. 1 is a front elevational view of a dial bore gage embodying the improvements of the present invention.
Figure 2:
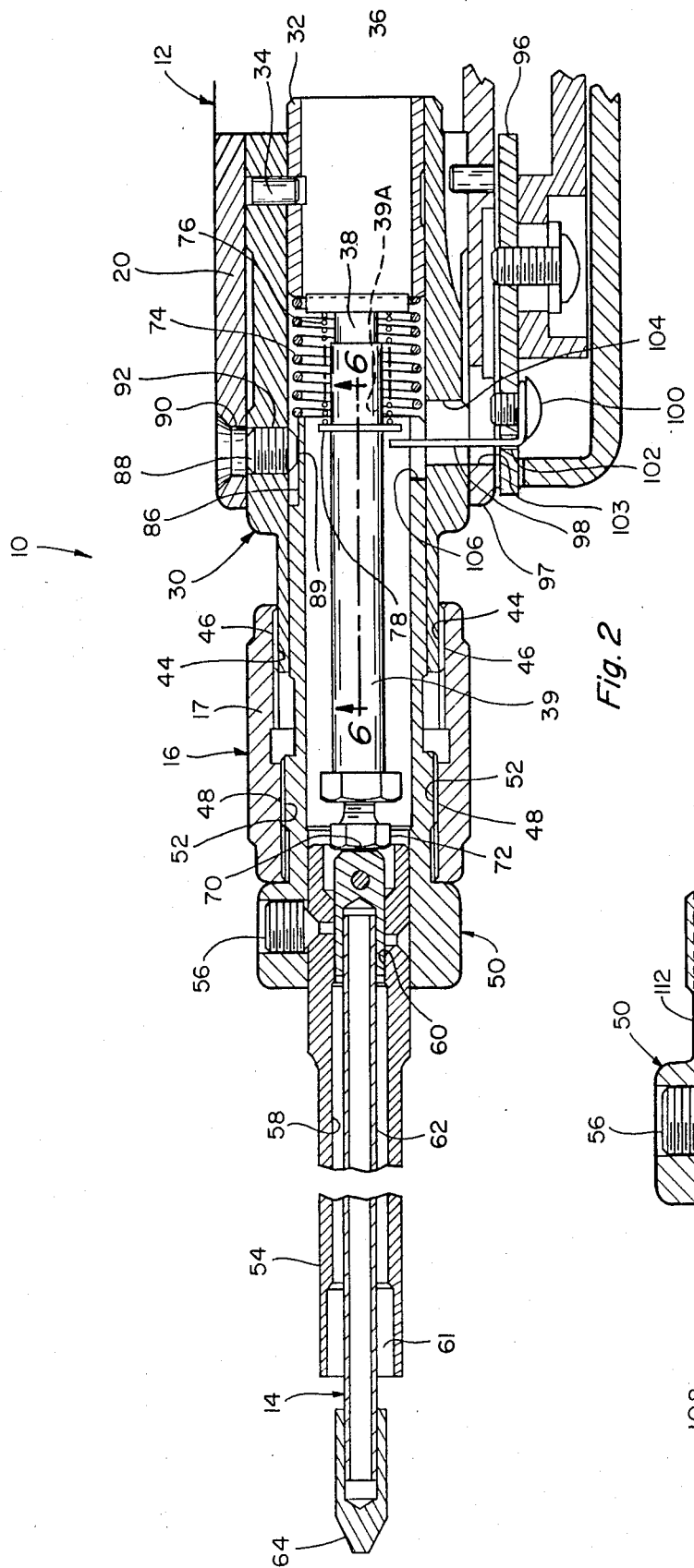
FIG. 2 is an enlarged fragmentary cross-sectional view taken along line 2—2 of FIG. 1.

Referring to the drawings more particularly by reference numbers wherein like numerals refer to like parts, number 10 in FIGS. 1 and 2 identifies a dial bore gage incorporating the improvements of the present invention. Dial bore gages and like measuring devices come in various sizes and shapes and generally include a dial portion 12 at one end thereof as shown in FIG. 1 for indicating a dimensional reading such as whether a bore diameter is over or under sized. This is determined by the gage reading when the gaging contacts of the device are in engagement with locations on a diameter of a bore being gaged. In this regard, the gage 10 also includes a gaging or probe portion 14 having spaced and opposed work engaging contacts 66 and 68 for engaging the work surface such as a bore surface that has been honed to some desired diameter. The gage 10 further includes an elongated connection or stem portion which extends between and connects the dial and probe portions 12 and 14, this connection portion of the gage including the present gage improvements and adjustment means 16. A probe pressure release lever 18 operatively connected to means for releasing pressure on the work engaging members is likewise provided to facilitate insertion and removal thereof into and out of a bore to be gaged as will be hereinafter further explained.

The dial portion 12 of the present gage 10 includes a housing 20 which has an open-sided cavity 22 in which is positioned a rotatable dial assembly 24. The dial assembly 24 can be rotated in the cavity 22 and locked into any desired position by locking member 26. The provision of means for rotating the dial assembly 24 and means for locking the same represent a known means for zeroing the movable pointer associated with a particular dial indicator. Such features are obviated by the present gage adjustment means, and therefore may be eliminated from the gage. However, such features on a dial bore gage may be retained, if desired, to add further flexibility. It is mainly the construction and operation of the adjustment means 16 which are important to the present invention and represents the main novel features of the present gaging device.

Referring to FIG. 2, the dial housing 20 is shown mounted on a tubular member 30 which extends therefrom towards the probe assembly 14. The member 30 is pinned or keyed to another tubular member 32 by pin 34, and the member 32 extends into the dial housing 20 and accommodates a dial assembly extension member 36 which is connected to the dial assembly 24. The extension member 36 in turn slidably accommodates a further extension member 38 which, in turn, extends into a counterbore 39A in a dial operator member 39. The operator member 39 is movable axially and geared to change the positions of the rotatable indicator pointers 40 and 42 as best shown in FIG. 1. The dial assembly 24 is mounted or attached to the dial housing 20 in a conventional manner such as illustrated in Rutter U.S. Pat. No. 4,045,877.

The tubular member 30 functions as a dial assembly support means and includes an external threaded portion 44 located adjacent the end portion thereof which extends towards the probe assembly 14. The adjustment means 16 includes an adjustment member 17 having spaced internally threaded portions 46 and 48 of slightly different thread pitch, the internal threads 46 associated with one end of the adjustment member 17 being cooperatively engageable with the external threads 44 on the member 30. Another tubular member 50 (FIGS. 2 and 3) has an externally threaded portion 52 located intermediate the respective opposite ends thereof and is slidably receivable within the member 30 as best shown in FIG. 2. The internal threads 48 associated with the adjustment member 17 are cooperatively engageable with the external threads 52 on the member 50. Since the spaced threaded portions 46 and 48 (and 44 and 52) are of slightly different pitch, rotation of the threaded adjustment member 17 will produce some slight relative axial movement between the respective members 30 and 50 and this in turn will produce changes in the gage setting for each position thereof. This assumes that the members 30 and 50 and the parts fixedly attached thereto are not able to rotate relative to each other as is true and will be hereinafter explained.

The tubular member 50 functions as support means for the probe assembly 14 and is constructed to receive the fixed probe portion 54 as shown in FIG. 2. The member 50 may be fixedly secured to the probe portion 54 by means such as set screw 56. It is recognized that different known types of probe assemblies including those disclosed in co-pending Rutter U.S. patent application Ser. No. 153,350, filed Feb. 8, 1988 as well as others can be used with the present invention.

The probe assembly 14 includes the elongated tubular member 54 which has a passageway or bore shown formed by communicating bore portions 58 and 60 which together extend therethrough from end-to-end. The bore portion 58 also receives a bushing 61 in its free end as shown. The bores 58 and 60 including the bushing 61 slidably receive a plunger assembly 62 which is positioned therein for axial movement. The plunger 62 includes a tapered forward end portion 64 adaptable for cooperatively engaging gaging and centralizing elements associated with the probe assembly 14 such as the ball-like gaging and centralizing members 66 and 68 shown in FIG. 1. Axial movements of the plunger 62 in a forward direction (away from the dial portion 12) will displace the members 66 and 68 radially outwardly during a gaging operation. It is important to the present invention that when the probe member 54 is fixedly secured to the probe support means 50, the end surface 70 of the plunger 62 engages and bears against the terminal end surface of a member 72 which is attached to the dial operator member 39 as shown in FIG. 2. Since the probe member 54 is fixedly secured to the probe support member 50, axial movement of the member 50 will produce a corresponding axial movement of the member 54. This means that when the adjustment member 17 is rotated in either direction about the respective threaded portions 44 and 52, the plunger 62 will move axially relative to the members 54 and 50. If the gaging balls 66 and 68 are in a bore or between the fixed contacts of a setting fixture, this means that they will operate through the members 64 and 62 against the end of the member 39 to change the position of the pointers 40 and 42. This therefore enables the operator to very accurately zero the dial indicator to any desired diameter as will be further hereinafter explained.

Resilient means in the form of a compression spring member 74 is positioned about the members 38 and 39 between the respective ends of the members 32 and 50 as shown in FIG. 2. The spring member 74 is a fairly strong spring and applies constant pressure to urge the probe support means 50 away from the dial portion 12 of the gage 10. This arrangement forces the respective cooperatively engageable threaded portions 44 and 46 and 48 and 52 into predetermined engagement with each other in all positions of adjustment of the member 17 thereby eliminating any looseness or play between the respective engaged threads. This acts to provide axial backlash compensation between the members 17, 30 and 50 thereby improving the gage accuracy and response in all positions of adjustment.

Other resilient means in the form of a relative weaker compression spring 76 is also provided to maintain the operator arm 39 engaged with the end surface 70 of the plunger assembly 62. The spring member 76 is positioned about overlapping ends of the members 38 and 39 (FIG. 2) such that one end portion thereof engages and bears against one end of the extension member 36 while the opposite end engages an annular flange or retaining ring 78 on the member 39. The spring 76 applies pressure to constantly urge the terminal end portion 72 of the operator arm 39 into engagement with the end surface 70. The spring member 76 is weaker than the spring member 74 and its main purpose is to maintain the members 39 and 62 engaged and to a much lesser extent may provide a small amount of backlash compensation.

Figure 4:
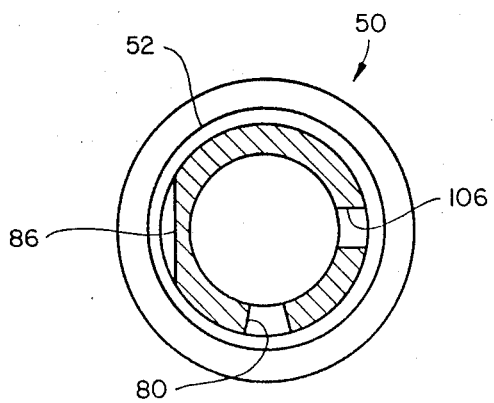
FIG. 4 is an enlarged cross-sectional view taken along line 4—4 of FIG. 3.
Figure 5:
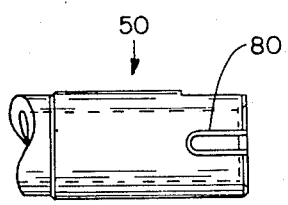
FIG. 5 is a partial side elevational view of the right end portion of the probe support means of FIG. 3 shown rotated 90° with respect thereto.
Figure 6:
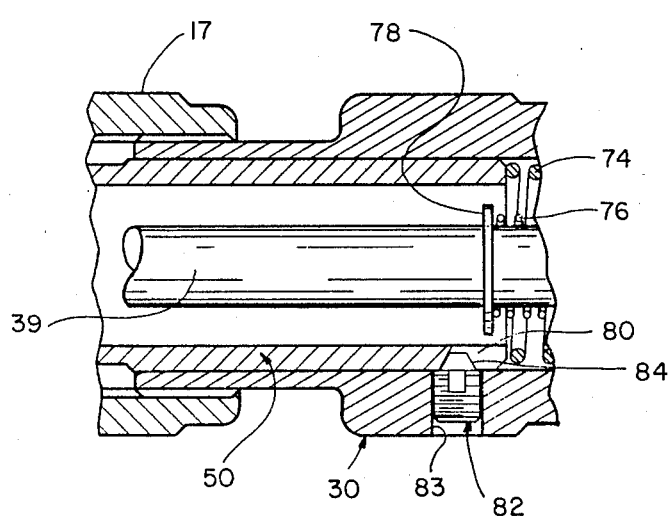
FIG. 6 is an enlarged fragmentary cross-sectional view taken along line 6—6 of FIG. 2.

The probe support means 50 also includes a tapered or beveled elongated slot 80 located adjacent the end thereof nearest the dial portion 12 as best shown in FIGS. 4 and 5. The slot 80 slidably receives a tapered portion 84 of a locking element or screw 82 as best shown in FIG. 6. The locking element 82 is threadedly engaged with opening 83 in the dial support member 30. This screw and slot arrangement between the members 30 and 50 substantially eliminates relative angular but not relative axial movement therebetween. However, there should be sufficient clearance between the tapered portion 84 of the set screw 82 and the elongated slot 80 in the member 50 to enable the members 30 and 50 to move axially relative to each other.

Figure 3:
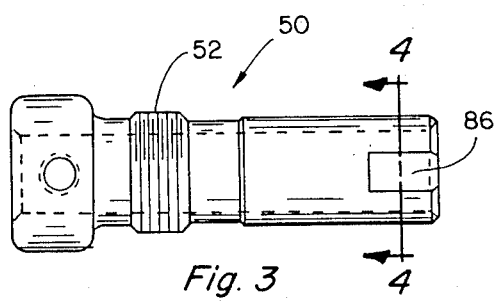
FIG. 3 is a side elevational view of the probe support means in the gage of FIG. 2 shown rotated 90° with respect thereto.

The probe support member 50 also has a flat 86 machined on it adjacent the same end thereof as the slot 80 as best shown in FIGS. 2 and 3. A set screw 88 having a flat inner surface 89 is able to pass through opening 90 formed in the housing 20 to be threadedly positioned in threaded opening 92 in the member 30. The set screw 88 is used to lock member 50 in relation to member 30 axially once the gage has been set to the correct reading. This prevents accidentally changing the reading by either moving member 17, or by accidentaly bumping or dropping the gage.

Once the gaging contacts associated with the probe assembly 14 are set between spaced setting surfaces on a setting fixture, or are engaged with opposite sides of a surface to be gaged, or are set by engagement with a ring gage or the like, and while maintaining the gaging contacts so engaged, the adjustment member 17 is rotated to move the aligned members 62 and 39 to reposition the movable pointers 40 and 42 to a zero setting on the dial face. This accurately zero sets the dimension being engaged by the gaging members 66 into the gage so that thereafter when the probe portion of the gage 10 is inserted into a bore it will indicate if the bore is of the desired diameter and if not how much it is over or under size.

It is important to the present invention that the engaged threaded portions 44 and 46 be of slightly different pitch than the engaged threaded portions 48 and 52 because it is this difference in thread pitch that enables the members 30 and 50 to move axially relative to each other during adjustment. The amount of difference in pitch thread will determine the rate of relative axial movement and the range of such axial movement between the members 30 and 50. For example, if the pitch of the threaded portions 44 and 46 is 32 threads per inch and the pitch of the threaded portions 48 and 52 is 40 threads per inch, one complete rotation of the adjustment member 17 in either direction will produce a corresponding relative axial movement between the members 30 and 50 of about 0.00625 inches. This means that the dial operator arm member 39 will move axially by this distance (assuming the gaging members 66 are held fixed) and this will produce rotation of the pointers 40 and 42 to establish a desired gage setting. The rate of change and the range of movement can be adjusted by selecting the thread pitches desired. The ability to precisely set the dial bore gage by zeroing the dial indicator to some desired reading in this manner prior to use allows the operator to achieve the full range of possible adjustment without moving the position of the dial portion of the gage as has been the practice with known dial bore gages.

The adjustment member 17 is shown having a knurled outer surface 94 (FIG. 1) which the operator grips when making an adjustment. Once the movable pointers 40 and 42 are repositioned to align such pointers to a zero setting on the dial face of the gage portion 12 as explained, the gage 10 is ready for use.

The gage 10 also includes means 18 operable to release pressure on the work engaging members 66 and 68 so that the probe portion 14 can be inserted into a bore to be gaged without any outward or radial force being applied to the gaging contacts or work engaging portions thereby minimizing the possibility for damage or wear on the work engaging members due to rubbing on the work surface. The probe release lever 18 is operatively connected by bell crank means (not shown) to the member 96 (FIG. 2) such that movements of the release lever 18 inwardly towards the dial housing 20 will cause axial movement of the member 96 in the direction of the dial portion 12. This causes a retractor member 98 fixedly secured to the member 96 adjacent the end thereof to also move. The member 98 is connected to the member 96 by fastener member 100 (FIG. 2) and extends through aligned openings 102 and 103 formed in the members 96 and 97. The retractor member 98 also extends through an oversized opening 104 (FIG. 2) formed in the member 30 and further extends through a slot 106 formed in the member 50 (FIGS. 2 and 4) such that its terminal end portion is in spaced axial alignment with or overlaps the annular flange 78 on the member 39. As the member 96 moves toward the dial portion 12 during a retraction operation, the retractor member 98 likewise moves in the same direction and will move against the annular member 78. Further movement of the retraction members 96 and 98 in the same direction will move the dial operating arm 39 in a direction away from the probe end portion 70 thereby releasing pressure on the plunger assembly 62 which in turn releases pressure exerted by the work engaging members 66 and 68 so that the probe assembly 14 can be inserted or removed from a work surface without rubbing thereaginst under pressure. The release of outward pressure of the work engaging members is important to the present invention for the reasons stated. This not only reduces the possibility of damage to the bore surface being gaged but also minimizes the possibility for damage or wear to the work engaging members.

Figure 7:
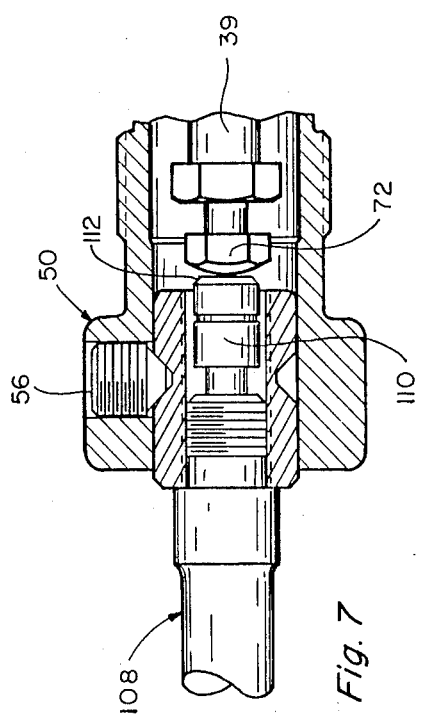
FIG. 7 is a further enlarged fragmentary cross-sectional view of the stem portion of the gage of FIG. 2 showing a modified form of the probe assembly associated therewith.

FIG. 7 is an enlarged fragmentary cross-sectional view of the central stem portion of the gage 10 of FIG. 2 illustrating in greater detail use of another embodiment 108 for the probe assembly. The probe assembly 108, like the probe assembly 14, is mounted in the probe support means 50 and includes a modified plunger assembly 110 as shown. Like the plunger assembly 62, the end portion 112 of the plunger 110 extends towards the dial portion 12 and engages the terminal end portion 72 of the dial operator arm 39. Operation of this embodiment is similar to that described above.

Thus there has been shown and described novel means for making fine adjustments between the probe tip and the movable pointer portions of a dial bore gage, which means fulfill all of the objects and advantages sought therefor. Many changes, modifications, variations and other uses and applications of the present improvements will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. In a dial bore gage having spaced and connected dial and probe portions, the improvement comprising means biasing the dial portion of the gage into engagement with the probe portion and means located between the dial and probe portions adjustable to change the relative axial positions of the dial and probe portions, said adjustable means including a first member connected to the dial portion of the gage having a first threaded portion thereon including threads of a first predetermined pitch, a second member operatively connected to the probe portion having a second threaded portion thereon including threads of a second predetermined pitch different from the thread pitch of the first threaded portion, and an adjustable member having spaced first and second threaded portions cooperatively engageable respectively with the first and second threaded portions of the first and second members whereby rotation of the adjustable member will produce relative movement between the first and second members.

2. The improvement of claim 1 including means to prevent relative rotational movement between the dial portion of the gage and the probe portion.

3. The improvement of claim 1 including means actuable to release the means biasing the dial portion of the gage into engagement with said probe portion.

4. The improvement of claim 1 wherein the probe portion includes pairs of opposed gaging and centralizing elements.

5. The improvement of claim 1 including means biasing the threaded portions on said first, second and adjustable members into engagement axially.

6. The improvement of claim 2 wherein the means to prevent relative rotational movement between said dial portion and said probe portion includes an elongated slot formed in one of said first and second members, and means in the other of said first and second members cooperatively engageable with said slot.

7. The improvement of claim 1 wherein the probe portion includes working engaging portions, said adjustment means establishing a desired gage setting condition when said work engaging portions are maintained in fixed spaced relation to each other.

8. A dial bore gage for gaging the diameter of cylindrical work surfaces, said gage having a dial portion with a dial face and a movable indicator member for indicating a reading, a probe portion having a plurality of radially movable work engaging members associated therewith, said probe portion having an operator member operatively connected to the indicator member, and means connecting the dial portion to the probe portion including an adjustment member, said adjustment member having spaced threaded portions each including threads of distinctly different pitch, the probe portion and the dial portion each having a threaded portion cooperatively engaged respectively with one of the spaced threaded portions on the adjustment member, rotation of said adjustment member producing relative movement between said dial and probe portions, means biasing the threaded portions on the adjustment member into engagement axially with the threaded portions on the dial and probe portions, other means biasing the work engaging members radially outwardly on said probe portion, and means on the gage actuable to release the pressure exerted by said biasing means on said work engaging members to facilitate insertion and removal thereof into and out of a work surface to be gaged.

9. The dial bore gage of claim 8 including means to prevent relative rotational movement between the dial and probe portions.

10. The dial bore gage of claim 8 wherein the means biasing said work engaging members radially outwardly also bias the probe assembly into engagement with the dial portion.

11. In a dial bore gage having spaced and connected dial and probe portions, said probe portion including at least one pair of work engaging members for engaging a work surface to be gaged, and means on the gage for urging the work engaging members radially outwardly, the improvement comprising adjustment means for establishing a predetermined setting of said dial portion for a predetermined spacing between the work engaging members, said adjustment means including a first member cooperatively connected to said dial portion having a first threaded portion thereon of predetermined thread pitch, a second member operatively connected to said probe portion having a second threaded portion thereon of a different predetermined thread pitch, and an adjustment member rotatably mounted to said first and second members, said adjustment member having spaced threaded portions cooperatively engageable with the first and second threaded portions of said first and second members, means to prevent relative rotational movement between said first and second members, rotation of said adjustment member producing relative axial changes in the position of said probe portion relative to the position of said dial portion, means biasing the first member axially relative to the second member to maintain axial pressure between the threaded portions on the adjustment member and the threaded portions engaged therewith on said first and second members, and means on the gage actuatable to release the outward pressure exerted on the work engaging members.

12. A dial bore gage for gaging cylindrical work surfaces comprising spaced connected dial and probe portions, said dial portion including a scale and means movable to indicate a reading on said scale, said probe portion including at least two spaced opposed work engaging members for engaging opposite sides of a cylindrical surface to be gaged, means connecting said dial portion with said probe portion including a first member operatively connected to said dial portion and having a threaded portion of predetermined thread pitch associated therewith, a second member operatively connected to said probe portion having a second threaded portion associated therewith wherein the threads are of a different predetermined thread pitch, an adjustment member having spaced threaded portions cooperatively engageable respectively with the threaded portions of said first and second members, means to prevent relative rotational movement between said first and second members, rotation of said adjustment member producing relative axial movement between said first and second members, means biasing the work engaging members radially outwardly on said probe portion, and actuator means on said dial portion operable to release the means biasing said work engaging members, said actuator means including a lever mounted on the dial portion.

13. The dial bore gage of claim 12 wherein the means biasing the work engaging members radially outwardly includes tubular means extending between and connecting the dial and probe portions, a plunger member axially moveable in said tubular means having a first end operatively engageable with the work engaging members and an opposite end operatively engageable with the dial portion, and means biasing the plunger member toward the probe portion.

* * * * *